United States Patent
Meier et al.

(10) Patent No.: US 6,950,628 B1
(45) Date of Patent: Sep. 27, 2005

(54) METHOD FOR GROUPING 802.11 STATIONS INTO AUTHORIZED SERVICE SETS TO DIFFERENTIATE NETWORK ACCESS AND SERVICES

(75) Inventors: Robert C. Meier, Cuyahoga Falls, OH (US); Tim Olson, San Jose, CA (US); Victor J. Griswold, North Canton, OH (US); Sheausong Yang, Saratoga, CA (US); Bhavannarayana Nelakanti, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 90 days.

(21) Appl. No.: 10/212,193

(22) Filed: Aug. 2, 2002

(51) Int. Cl.[7] ................................................. H04B 7/00
(52) U.S. Cl. ...................... 455/41.2; 455/41.1; 455/461; 455/414.1; 455/418; 455/417; 455/456.4; 340/7.1; 340/870.02; 342/357.1; 342/357.06; 342/357.13
(58) Field of Search ............................. 455/41.1, 41.2, 455/414.1, 418, 461, 456.4, 512; 340/7.1, 870.02; 342/357.1, 357.66, 357.13

(56) References Cited

U.S. PATENT DOCUMENTS

| | | | | |
|---|---|---|---|---|
| 6,097,960 A | * | 8/2000 | Rathnasabapathy et al. | 455/461 |
| 6,181,927 B1 | * | 1/2001 | Welling et al. | 455/414.1 |
| 6,181,935 B1 | * | 1/2001 | Gossman et al. | 455/433 |
| 6,266,013 B1 | * | 7/2001 | Stilp et al. | 342/387 |
| 6,301,474 B1 | * | 10/2001 | Hartmaier et al. | 455/417 |
| 6,332,077 B1 | * | 12/2001 | Wu et al. | 455/432.1 |
| 6,512,754 B2 | * | 1/2003 | Feder et al. | 370/338 |
| 6,577,643 B1 | * | 6/2003 | Rai et al. | 370/466 |
| 6,587,433 B1 | * | 7/2003 | Borella et al. | 370/230 |
| 6,608,832 B2 | * | 8/2003 | Forslow | 370/353 |
| 6,636,502 B1 | * | 10/2003 | Lager et al. | 370/352 |

OTHER PUBLICATIONS

Microsoft, Recommendations for IEEE 80.2.11 Access Points, Web Article listed on micrsoft,com; Apr. 2, 2002.
International Search Report mailed Jan. 23, 2004 related to PCT Patent Application No. PCT/US03/22982.

* cited by examiner

*Primary Examiner*—Marceau Milord
(74) *Attorney, Agent, or Firm*—Tucker Ellis & West LLP (57) ABSTRACT

A method for associating a WSTA to a service set, wherein the service set is configurable at the AP. Each service set is an arbitrary grouping of one or more network service parameters, and is typically configured for either VLAN or proxy mobile IP host. When a wireless station desires to associate with an access point, the wireless station sends a message to the access point, the message containing a SSID. The access point then matches the SSID to a service set and associates the WSTA to either a home subnet or a VLAN based on the SSID. By locally configuring the service set, the default VLAN and home subnet for a WSTA may be different at each AP the WSTA encounters. A security server is configured with a list of allowed SSIDs for each wireless station to prevent unauthorized access to a VLAN or home subnet.

28 Claims, 5 Drawing Sheets

METHOD FOR GROUPING 802.11 STATIONS INTO AUTHORIZED SERVICE SETS TO DIFFERENTIATE NETWORK ACCESS AND SERVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

The present invention relates generally to network access and more particularly to a method and system to differentiate network access for different classes of users.

It is becoming increasingly important to differentiate network access for different classes of users, in particular different classes of wireless LAN users. One proposal for providing differentiated network access and services is that Access Points should implement a method wherein a Remote Authentication Dial-In User Server (RADIUS server) explicitly assigns an 802.11 station to a Virtual LAN identifier (VLAN ID) by returning a VLAN ID attribute in the RADIUS record for the station. Such RADIUS based VLAN assignment has limited scope and severely restricts mobility. A large or campus network may contain multiple VLANs that provide equivalent services. For example, a campus network may contain multiple Voice VLANS. If a RADIUS server explicitly assigns an 802.11 Voice over IP (VoIP) phone to a voice VLAN, then the phone is limited to a single voice VLAN, for example the phone may be limited to a VLAN on a single floor in a single building. The only method for segregating users is "VLAN trunking"; therefore, the proposal is generally limited to network areas with a VLAN infrastructure. Thus there exists a need for a method and system wherein multiple parameters can be grouped into a Service Set, which is controlled by a single RADIUS attribute that is not limited to a VLAN ID assignment.

For the purposes of describing the present invention, an "authorized WSTA" is any station that is explicitly authorized to access the network via a security server, and a "guest WSTA" is not explicitly authorized to access the network. A RADIUS server is used as an example security server in describing the present invention, but as those skilled in the art can readily appreciate the concepts of the present invention apply with any security server.

It should be noted that a "Service Set" as defined herein is not the same as an 802.11 Extended Service Set (ESS).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

In view of the aforementioned needs, the invention contemplates a method for an access point to associate a wireless station to either a home subnet or a VLAN based on a configuration stored locally at the access point. When a wireless station desires to associate with an access point, the wireless station sends a message to the access point, the message containing a service set identifier (SSID), which is an arbitrary "name" for a service set. The access point then associates the wireless station to either a home subnet or a VLAN based on the SSID.

The method may also further comprise creating one or more service sets at the access point wherein each service set has a unique SSID. The access point upon receiving a message from a wireless station then matches the SSID of the message with a service set stored locally at the access point. After the access point confirms that it has a match for the SSID, the access point may then verify that the connection by the wireless station is authorized and that the station is authorized to use the SSID. This would typically be accomplished by using a security server such as a RADIUS server.

If the wireless station is currently bound to a remote home subnet, the access point enables communication between the wireless station and home subnet by tunneling to the home subnet. Alternatively, the access point may bind the wireless station to a home subnet that is local to the access point.

In an alternative embodiment, it is contemplated that the access point may send a list of subnets and/or VLAN's available for the SSID. The wireless station then selects a subnet or VLAN.

In another embodiment, the present invention contemplates a computer-readable medium instructions for an access point to associate a wireless station. The computer-readable medium comprising means for creating a service set at the access point the computer-readable medium further comprising means for receiving a message from a wireless station, the message containing an SSID. The computer-readable medium also comprising means for verifying the access point has a matching service set for the SSID. The computer-readable medium further comprises means for authenticating a wireless station by accessing a security server that is communicatively coupled to the access point. The computer-readable medium having means for associating the wireless station to either a VLAN or a home subnet based on the SSID. In an alternative embodiment, the security server returns a list of one or more SSIDs for which the station is authorized. The station is prevented from accessing the network if its SSID does not match one of the SSIDs in the list returned by the security server.

The present invention further contemplates an access point, comprising means for assigning one of the group selected from a VLAN and a subnet to a service set; means suitably adapted for receiving a message from a wireless station, the message further comprising a SSID; means suitably adapted to match the SSID to the service set; means suitably adapted for authenticating a wireless station by accessing a security server, means for associating the wireless station to one of the group consisting of a home subnet or VLAN based on the SSID, wherein the service set home subnet or VLAN parameter is configured locally at the access point.

The access point may also further comprise means for binding the wireless station to the home subnet, means for tunneling to the home subnet. In the alternative, the access point may have means for binding the wireless station to a local subnet.

In yet another embodiment, the present invention contemplates an access point, comprising means for creating a service set at the access point; means for accessing the access point by sending a message from the wireless station to the access point, the message comprising a SSID; means for verifying the access point has a matching service set for the SSID; means for authenticating the wireless station by the access point accessing a security server that is communicatively coupled to the access point; means for providing the wireless station with a list of subnets available for the SSID; and wherein the service set is configured locally at the access point.

The present invention also contemplates an 802.11 network, comprising a first basic service set comprising a first access point, and a second basic service sets, comprising a second access point. The first access point comprises means for creating a service set at the first access point; means for receiving a message from the wireless station to the first access point, the message comprising a SSID; means verifying the first access point has a matching service set for the SSID; and means for associating the wireless station to a first home subnet based on the SSID. The second access point comprises means for creating a service set at the second access point; means for receiving a message from the wireless station to the second access point, the message comprising the SSID used in the message to the first access point; means verifying the second access point has a matching service set for the SSID; and means for associating the wireless station to a second home subnet based on the SSID, wherein the first home subnet is different than the second home subnet.

In another embodiment, the present invention contemplates an 802.11 network, comprising a first basic service set comprising a first access point, and a second basic service sets, comprising a second access point. The first access point comprises means for creating a service set at the first access point; means for receiving a message from the wireless station to the first access point, the message comprising a SSID; means verifying the first access point has a matching service set for the SSID; and means for associating the wireless station to a first VLAN based on the SSID. The second access point comprises means for creating a service set at the second access point; means for receiving a message from the wireless station to the second access point, the SSID used in the message to the first access point; means verifying the second access point has a matching service set for the SSID; and means for associating the wireless station to a second VLAN based on the SSID, wherein the first VLAN is different than the second VLAN.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof

BRIEF DESCRIPTION OF THE SEVERAL VIEWS OF THE DRAWING

The drawings illustrate the best mode presently contemplated of carrying out the invention.

This the drawings.

DETAILED DESCRIPTION OF INVENTION

The present invention contemplates a method where wireless stations (WSTAs) are partitioned into "Service Sets." A Service Set Identifier (SSID) identifies each service set. The SSID can be a standard 802.11 SSID.

A Service Set is an arbitrary grouping of one or more network service parameters. Service parameters may be used to differentiate network access for security purposes. For example, "guest" WSTAs that are restricted to secure "guest" subnets may be grouped into a "GUEST" Service Set. Service parameters may also be used to differentiate network services that are not necessarily related to security. For example, employee WSTAs that require a "Proxy Mobile IP" service for seamless campus mobility may be grouped into a "MOBILE-EMPLOYEE" Service Set.

Service Set authorization is accomplished in one of two ways. While the following examples use a RADIUS server, as those skilled in the art can readily appreciate, the authorization may be accomplished with any security server. First a RADIUS server can explicitly authorize a WSTA to join one or more Service Sets. In the first case, the RADIUS server returns a list of allowed SSID's in the RADIUS record for the WSTA. For backward compatibility with legacy 802.11 systems the absence of the SSID list can be interpreted asa list of all SSIDs. Second, a RADIUS server can explicitly assign a WSTA to a Service Set. In that case, the RADIUS server returns an "assigned SSID" in the RADIUS record for the WSTA. Note that the first method enables the WSTA to change its active Service Set without requiring configuration changes to the RADIUS database.

A standard 802.11 WSTA sends an association message, which contains an 802.11 SSID, each time it associates with a parent AP. A WSTA is only associated if it successfully passes any authentication criteria that is defined for its SSID, and the WSTA is authorized to join the Service Set identified by its SSID or is explicitly assigned to a different SSID by the RADIUS server.

Unauthenticated "guest WSTAs" are assigned to a default guest Service Set, which may permit restricted access to the network.

Service set parameter values that determine a WSTA's home subnet are configured locally in wireless access points (APs) so that parameter values have local significance. For example, a campus network may have a voice VLAN in each building. A "VOICE" SSID can be bound to VLAN 10 in building 1 and VLAN 20 in building 2. A WSTA configured with the "VOICE" SSID can access any voice VLAN.

AP's determine current Service Set parameter values from SSID configuration values and WSTA 'context' information. For example, a WSTA may belong to a Service Set named "MOBILE" that has "seamless inter-subnet mobility" enabled. A "home subnet" may be configured for the "MOBILE" SSID in each AP. Initially, a "MOBILE" WSTA is bound to the home subnet configured for "MOBILE" in its parent AP. Thereafter, as the WSTA roams, it is seamlessly bound to its original home subnet, regardless of the "home subnet" configured for "MOBILE" in any new parent AP. A context transfer protocol is used to transfer the WSTA's home subnet context to a new parent AP.

The home subnet bindings for a "MOBILE" WSTA can be aged and discarded after the WSTA becomes inactive for some period of time so that the WSTA can be bound to a different, more optimal, home subnet when it becomes active again.

A WSTA's home subnet can be automatically derived by "snooping" the source IP address in IP packets transmitted by the WSTA rather than using an access point service set is parameter value to bind the WSTA to a home subnet. In that case, an SSID/home-subnet database is used to determine if the WSTA is authorized to access the home subnet that corresponds to its IP address. The SSID/home-subnet database contains a list of "allowed" subnets for each SSID. The database can be statically configured. Alternatively, APs can automatically determine the subnet address for each subnet that is accessible via one of its configured SSIDs. Note that the subnet address for an SSID may not be the same in different APs. The list of allowed subnets for each SSID is the aggregate of the local SSID/subnet bindings in all APs. (This method is necessary to support WSTA's with a permanet IP address. It is also necessary to re-establish home subnet bindings that have been aged and discarded.)

By using the Service Set method as described herein, a WSTA can be assigned to a specific VLAN ID. However this method is not limited to VLAN ID assignment. Instead, multiple parameters can be grouped into a single Service Set, which may be controlled by a single RADIUS or other security server attribute. Because the Serve Set parameters are instantiated locally in parent AP's, the Service Set parameters can be set to values that are optimal for the local network topology and current WSTA context. For example, either VLAN trunking or Proxy Mobile IP tunneling can be used, as is locally appropriate, to restrict guest WSTAs to a secure guest subnet.

Another feature that may be incorporated with the present invention is that a WSTA can change its Service Set without requiring changes to its RADIUS configuration. For example, a WSTA can inhibit seamless mobility, for example when it is running a non-IP application that prohibits inter-subnet mobility, by changing its active SSID to one that does not have Proxy Mobile IP enabled.

The method of the present invention may be implemented by using the standard 802.11 SSID, therefore, no changes are required to existing to WSTAs to obtain the benefits of the present invention.

Figure 1:
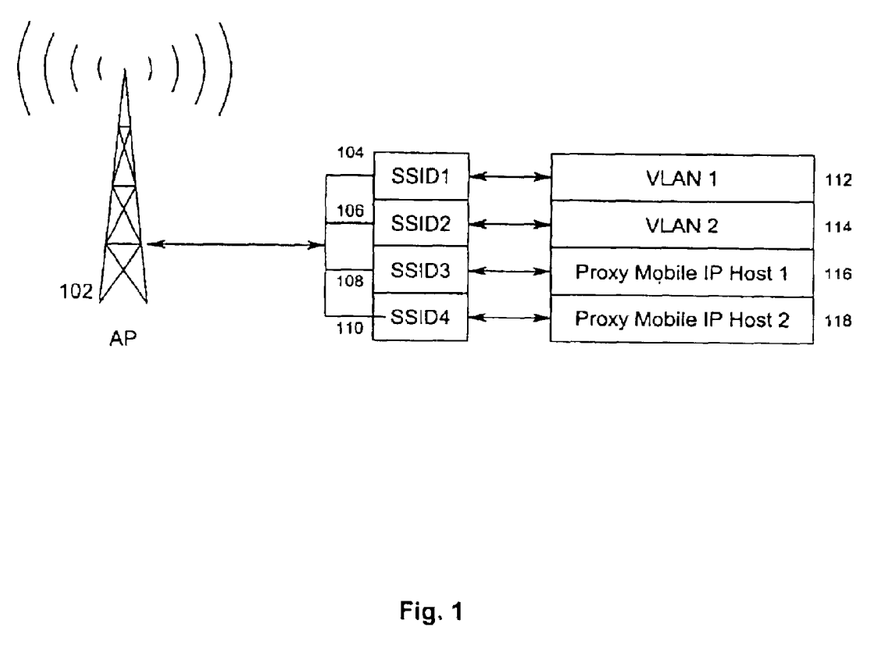
FIG. 1 is a block diagram illustrating the relationship between an AP, SSID and VLAN or Proxy Mobile IP Host as contemplated by the present invention.

Referring now to FIG. 1, there is shown an AP 102. The AP 102 as shown has for SSID numbers, 104, 106, 108, 110. Each SSID number 104, 106, 108, 110 has a corresponding parameter 112, 114, 116, 118 assigned to it. For example, the AP 102 will associate VLAN1 112 with SSID1 104 VLAN2 114 with SSID2 106, Prox Mobile IP Home Agent 1 116 with SSID3 108, and Proxy Mobile IP Home Agent 2 118 with SSID4 110.

Figure 2:
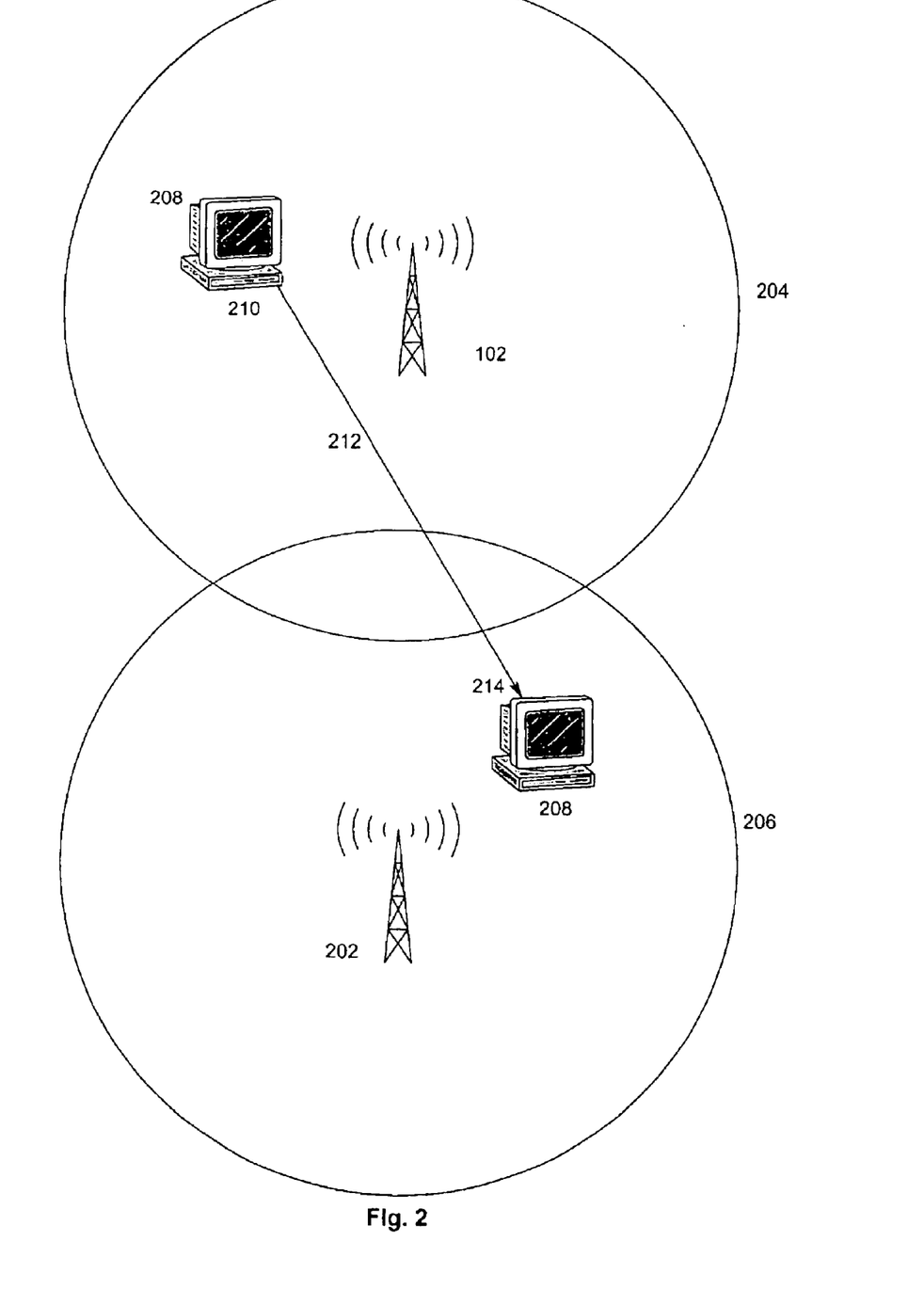
FIG. 2 is a block diagram illustrating a wireless station moving from one basic service set controlled by a first access point set to a second basic service set controlled by a second access point.

FIG. 2 shows an Extended Service Set (ESS) 200. The ESS comprises two basic service sets (BSS) 204 and 206. AP 102 controls BSS 204 and AP 202 controls BSS 206. A WSTA 208 is shown that travels a path 212 from BSS 204 to BSS 206. As contemplated by the present invention, when WSTA 208 associates with each AP 102 and 202, it sends an SSID (not shown) to the AP 102 or 202. Because each AP is individually configured, when WSTA is associated with AP 202 it may be bound to a different VLAN or Proxy Mobile IP Home Agent than it was when it was associated with AP 102.

Figure 3:
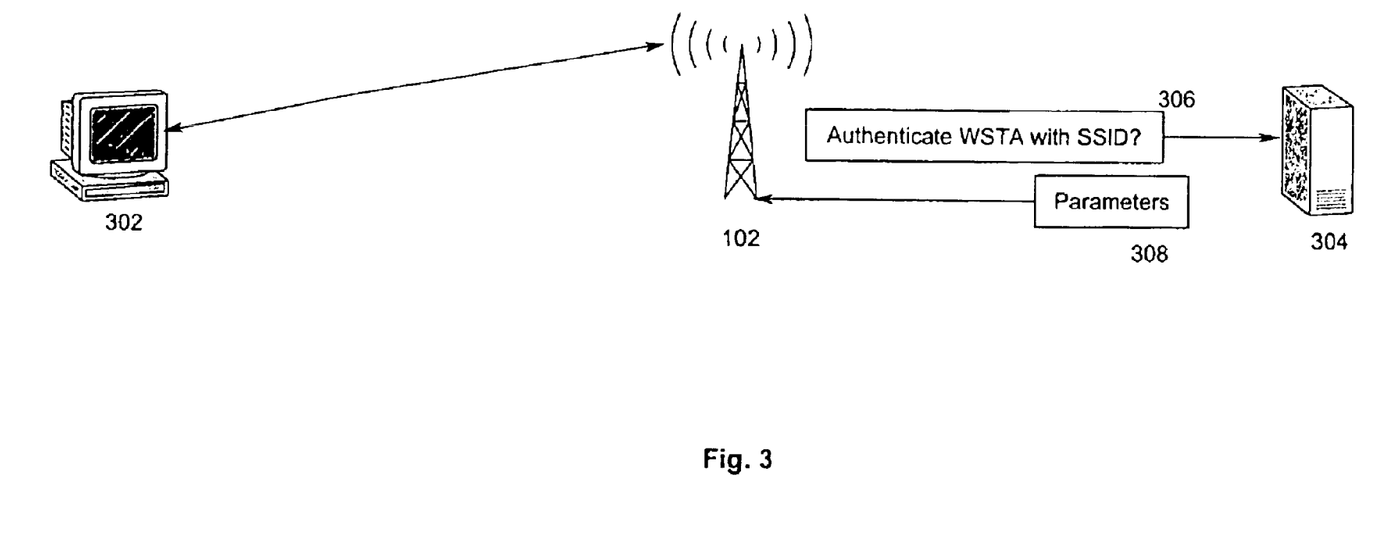
FIG. 3 is a block diagram illustrating the communications between a wireless station, access point, and a security server when a wireless station attempts to gain entry to a network.

Referring now to FIG. 3 there is shown a WSTA 302 attempting to gain access to AP 102. A message is sent from WSTA 302 to the AP 102. The AP 102 then attempts to authenticate the WSTA 302 by sending authentication message 306 comprising the WSTA 302 and the WSTA's SSID to security server 304. If the security server 304 authenticates WSTA 302, it then sends a message 308 containing parameters for the WSTA 302 to the AP 102.

Figure 4:
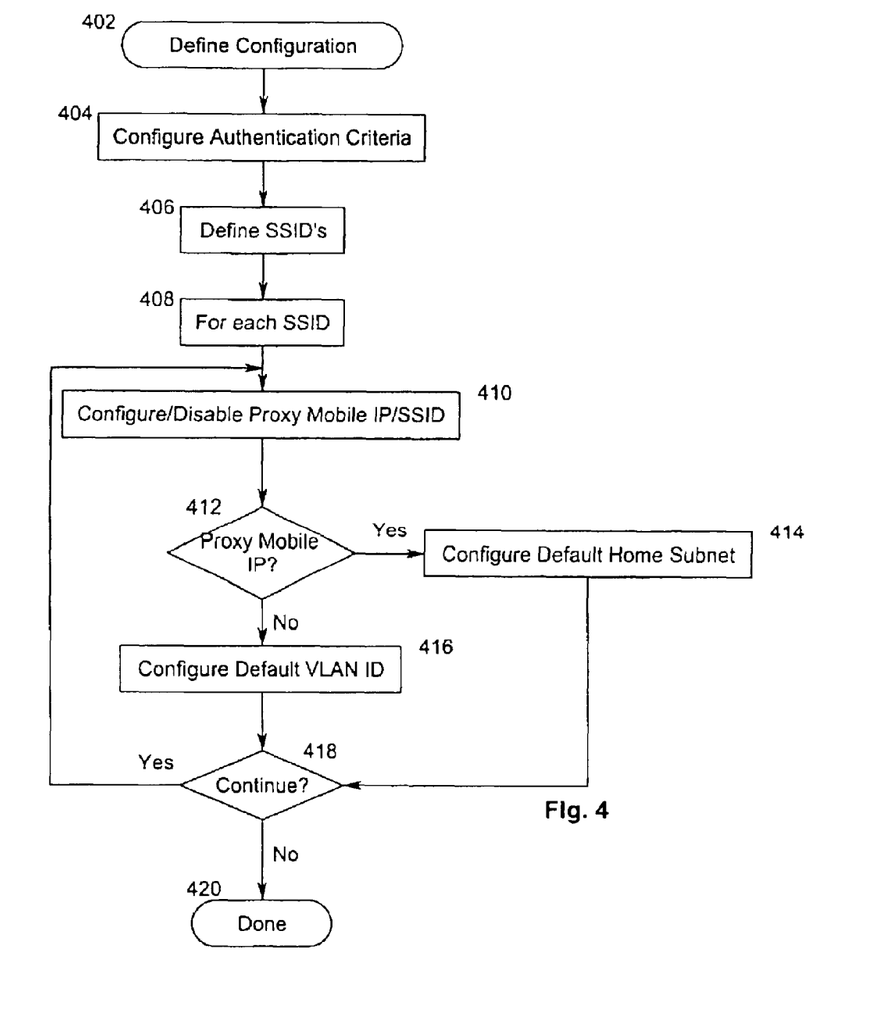
FIG. 4 is a block diagram illustrating the steps for configuring an access point for use with the present invention.

FIG. 4 shows an exemplar of a method that can be used for configuring an AP for use with the present invention. The process begins by defining a configuration at step 402. At step 404 the authentication criteria is defined. At step 406 the Service Sets and Identifiers are defined. Then as shown at step 408, for each ID which may be done either at the same time the for Service Set are defined or separately, the parameters for each SSID are defined. As shown in step 410 Proxy Mobile IP is either configured or disabled for each SSID. As shown in step 412, if Proxy Mobile IP is enabled, then the default home subnet is configured as shown at step 414. If Proxy Mobile IP is disabled, then the default VLAN ID is configured as shown at 416. If there are more Service Sets to configure, then as shown in step 418 processing returns to step 410, otherwise, as shown in step 420 the process is completed.

Figure 5:
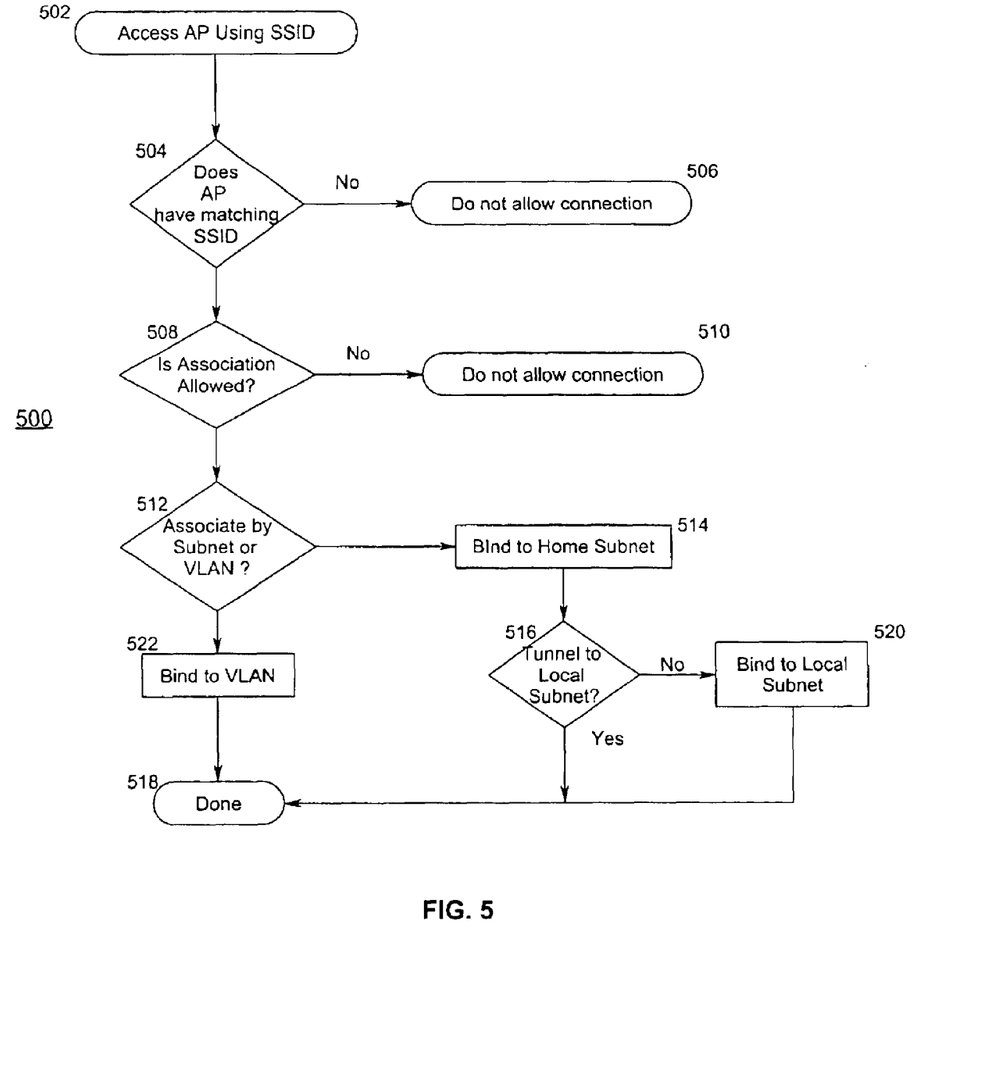
FIG. 5 is a block diagram showing the steps for a wireless station to associate with an access point.

In FIG. 5 there is shown a procedure 500 contemplated by the present invention for a WSTA 208 to associate with an AP 102. Beginning at step 502, the WSTA 208 accesses the AP 102 by sending a message to the AP 102, the message including a SSID (SSID). As shown in step 504, the AP 102 checks to ascertain if it has a matching SSID. If the AP 102 does not have a matching SSID, then as shown in step 506 the AP 102 does not allow the connection.

If the AP 102 does have a matching SSID, then the AP determines at step 508 if the association is allowed for the WSTA 208. This can be done by accessing a security server, such as a RADIUS server. For example, when the RADIUS server is accessed, the RADIUS server returns a list of allowed SSIDs. The association for the WSTA is only allowed if the WSTA's SSID is in the list. This prevents unauthorized access to a service set that is supported in the AP. If the association is not allowed, then at step 510 the AP does not allow the connection.

If the AP 102 does have a matching SSID and the WSTA 208 is allowed to associate, then the AP 102 determines whether to associate the WSTA 208 by Subnet or VLAN. If the association is by subnet, then the AP 102 binds the WSTA 208 to the home subnet 514. At step 516 the AP 102 determines if it can tunnel to the home subnet, if it can than the process is completed as shown in step 518.

If the AP 102 can not tunnel to the home subnet at step 516, then the AP 102 can bind the WSTA 208 to a local subnet as shown in step 520. Then as shown in step 518, the process is completed.

If at step 512 it is determined that the WSTA 208 is to be bound to a VLAN, then the procedure goes to step 522 wherein the WSTA 208 is bound to a VLAN. Then the procedure is completed as shown in step 518.

While in the description of the process of FIG. 5 the process terminates after associating the WSTA 208 to either a subnet or VLAN, as those skilled in the art can readily appreciate, other parameters may be configured at this point in time, As the WSTA 208 associates with another AP 202, the process is repeated. Because each AP 102, 202 has its own separate bindings for the Service Sets, when a WSTA 208 moves from one AP 102, to another AP 202, the VLAN or subnet that the WSTA 208 is bound to may change.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. An 802.11 network, comprising:
   a first basic service set comprising a first access point, and a second basic service sets, comprising a second access point;
   wherein the fast access point comprises
      means for creating a service set at the first access point that defines a set of network access parameter values to differentiate network services having an associated service set identifier;
      means for receiving a message from the wireless station to the first access point, the message comprising a service set identifier;
      means verifying the first access point has a matching associated service set identifier for the service set identifier sent in the message;
      means for associating the wireless station to a first VLAN based on the service set identifier; and
   wherein the second access point comprises
      means for creating a second service set at the second access point that defines a second set of network access parameter values to differentiate network services having an associated service set identifier;
      means for receiving a message from the wireless station to the second access point, the service set identifier used in the message to the first access point;
      means verifying the second access point has a matching associated service set identifier for the service set identifier;
      means for associating the wireless station to a second VLAN based on the service set identifier;
   wherein the first VLAN is different than the second VLAN.

2. A method wherein Wireless stations (WSTAs) are partitioned into Service Sets, each Service Set comprising a set of network access parameter values to differentiate network services and a Service Set Identifier, comprising the steps of:
   configuring an AP with a list of at least one service set identifier that identifies the service set the AP will accept;
   sending a message from the WSTA to its parent AP, the message comprising an active service set identifier for the WSTA, wherein the service set identifier is selected from the group consisting explicitly identifying a service set, and a wildcard so that the WSTA's service set is selected by a network infrastructure;
   verifying by the parent AP that the parent AP has a service set identifier that matches the service set identifier sent by the WSTA; and
   authorizing the WSTA to use its service set identifier by a security server and a security protocol;
   wherein service set parameters that determine the WSTA's access to network services is at least one of the group consisting of VLAN and home subnet may be configured with different values for the same service set identifier in a different AP.

3. The method of claim 2 wherein the security server is a RADIUS server and the security protocol is RADIUS.

4. The method in claim 3 further comprising a method wherein a list of allowed service set identifiers for a WSTA is sent from the RADIUS server to the parent AP in a RADIUS protocol message.

5. The method in claim 3 further comprising a method where a RADIUS server explicitly assigns a WSTA to a service by including an service set identifier in a RADIUS protocol message sent to the parent AP.

6. The method in claim 2 wherein a service set parameter that determines the WSTA's home subnet contains at least one of a VLAN Identifier and an IP subnet address.

7. The method in claim 6 further comprising a method where a WSTA is initially bound to a home subnet based on the service set parameter value in its parent AP, but the service set parameter is not used to bind the WSTA to a different home subnet as the WSTA roams to APs with a different service set parameter value, so that the WSTA is bound to a single home subnet as it roams.

8. The method in claim 7 where either VLAN trunking or IP tunneling is dynamically selected to bind a station to a single home subnet as it roams, so that the most optimal available access method is used to forward packets between the WSTA and its home subnet.

9. The method in claim 7 further comprising discarding home subnet bindings for a WSTA after the WSTA has become inactive for some period of time, so that the WSTA can bind to a different (i.e. more optimal) subnet when it again becomes active.

10. The method in claim 6 further comprising a method where a WSTA is bound to a different home subnet when it roams to an AP with a different service set parameter value, so that the WSTA is bound to the "optimal" home subnet.

11. The method in claim 2 where a WSTA uses a "wildcard" service set identifier to match a different service set identifier in the parent AP.

12. The method in claim 2 where the service set parameter that determines the WSTA's home subnet contains a Mobile IP home agent address.

13. The method in claim 2 further comprising a method wherein a service set parameter is used to determine whether a WSTA should be bound to a single home subnet as it roams in a network with multiple subnets.

14. The method in claim 13 wherein a service set parameter is used to determine whether Proxy Mobile IP and Mobile IP tunneling is used to bind a station to a single home subnet.

15. The method in claim 13 wherein the home subnet for a WSTA is determined by examining the IP address in IP packets transmitted by the WSTA.

16. The method in claim 15 further comprising a method wherein a station is not bound to a home subnet unless it is authorized to access that home subnet.

17. The method in claim 16 wherein a WSTA is authorized to access a home subnet only when there is at least one AP that has a parameter value for the services set identified by the WSTAs service set identifier that contains at least one of a VLAN ID and subnet address that identifies the home subnet.

18. The method in claim 17 where a central database is used to authorize a WSTA to access a home subnet, wherein the central database contains a list of service set identifiers and, for each service set identifier, a list of allowed subnets.

19. The method in claim 18 where the list of subnets for each service set identifier is statically configured or automatically populated with the local service set identifier and subnet bindings for each AP.

20. The method in claim 2 wherein an unauthenticated WSTA is assigned to a guest service set and where service set parameter values, configured for the guest service set at least 1 APs, are used to restrict the WSTA to at least one guest subnets.

21. The method in claim 2 wherein a WSTA is authorized to use more than one service set identifier so that the WSTA can change its service set without requiring configuration changes in the security server.

22. The method in claim 2 wherein the service set identifier is an 802.11 service set identifier and a wildcard service set identifier is an 802.11 broadcast service set identifier.

23. The 802.11 network of claim 1 wherein the service set identifier is an 802.11 service set identifier.

24. The 802.11 network of claim 1 further comprising
means for accessing a security server communicatively coupled to the first access point and the second access point;
wherein security server verifies the wireless station is authorized to use the service set associated with the service set identifier by the means for associating the wireless station to a first VLAN and the means for associating the wireless station to a second VLAN.

25. The 802.11 network of claim 24 wherein the security server is a Remote Authentication Dial-In User Server.

26. The 802.11 network of claim 24, the security server further comprising means for authenticating that the wireless station is authorized to use the service set identifier as configured on at least one of the first access point and the second access point.

27. The 802.11 network of claim 24, the security server further comprising means for authenticating that the wireless station is authorized to use its service set identifier via an allowed service set identifier list contained in a RADIUS record for the wireless station.

28. The 802.11 network of claim 1, the first access point's means for associating further comprising means for binding the wireless station to the first VLAN corresponding to an Ethernet VLAN, based on a service set parameter that is configured with a VLAN Identifier.

* * * * *